US009196030B2

(12) United States Patent
Wiemker et al.

(10) Patent No.: US 9,196,030 B2
(45) Date of Patent: Nov. 24, 2015

(54) SYSTEM AND METHOD FOR DETERMINING A PROPERTY OF BLUR IN A BLURRED IMAGE

(75) Inventors: Rafael Wiemker, Kisdorf (DE); Thomas Buelow, Grosshansdorf (DE); Steffen Renisch, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 625 days.

(21) Appl. No.: 13/496,496

(22) PCT Filed: Sep. 15, 2010

(86) PCT No.: PCT/IB2010/054154
§ 371 (c)(1),
(2), (4) Date: Mar. 16, 2012

(87) PCT Pub. No.: WO2011/033455
PCT Pub. Date: Mar. 24, 2011

(65) Prior Publication Data
US 2012/0163694 A1 Jun. 28, 2012

(30) Foreign Application Priority Data
Sep. 18, 2009 (EP) .................................... 09170638

(51) Int. Cl.
*G06K 9/00* (2006.01)
*G06T 7/00* (2006.01)
*G06T 5/00* (2006.01)

(52) U.S. Cl.
CPC .............. *G06T 7/0002* (2013.01); *G06T 5/003* (2013.01); *G06T 7/004* (2013.01); *G06T 2207/10104* (2013.01); *G06T 2207/20201* (2013.01); *G06T 2207/30004* (2013.01)

(58) Field of Classification Search
None
See application file for complete search history.

(56) References Cited

U.S. PATENT DOCUMENTS

2007/0237290 A1\* 10/2007 Mostafavi ........................ 378/21
2008/0240607 A1 10/2008 Sun et al.
(Continued)

FOREIGN PATENT DOCUMENTS

| JP | 2006058428 A | 3/2006 |
| JP | 2007029502 A | 2/2007 |

(Continued)

OTHER PUBLICATIONS

Reyes Aguirre "Respiratory Motion Compensation in Emission Tomography", Thesis, Universit'e De Nice-Sophia Antipolis, Oct. 8, 2008, 167 Pages.

(Continued)

*Primary Examiner* — Jason Heidemann

(57) ABSTRACT

A system and a method of determining a property of blur in an image are provided. According to other aspects a medical image acquisition apparatus, a medical workstation and a computer program product are provided. The system (100) comprises a receiver (102) for receiving the image of an object-of-interest of a body. The image comprises blur. Further, the system comprises a determining subsystem (122) for determining a value of a characteristic of the blur in the image on individual lines of a plurality of lines intersecting with the object-of-interest at different angles. Thus, the lines extend in different directions. The determination of the value comprises analyzing the image along the respective lines. The system further comprises an obtaining subsystem (126) for obtaining a direction in which the value of the characteristic of the blur is maximal, based on the determined values on the individual lines of the plurality of lines, which lines extend in different directions.

18 Claims, 5 Drawing Sheets

(56) References Cited

U.S. PATENT DOCUMENTS

| | | | |
|---|---|---|---|
| 2010/0266180 A1* | 10/2010 | Kadir et al. | 382/131 |
| 2012/0051626 A1* | 3/2012 | Long et al. | 382/154 |
| 2012/0114212 A1* | 5/2012 | King et al. | 382/131 |

FOREIGN PATENT DOCUMENTS

| | | |
|---|---|---|
| WO | 2007100955 A2 | 9/2007 |
| WO | 2008127368 A2 | 10/2008 |

OTHER PUBLICATIONS

Joshi et al, "PSF Estimation Using Sharp Edge Prediction", Computer Vision and Pattern Recognition, Jun. 23, 2008, pp. 108.

Luo et al, "Motion Blur Detection in Radiographs", Medical Imaging, Proc. of SPIE, vol. 6914, 2008, pp. 1-8.

El Naqa, "Deblurring of Breathing Motion Artifacts in Thoracic PET Images by Deconvolution Methods", Medical Physics, vol. 33, Issue 10, Oct. 2006, pp. 3587-3600.

El Naqa, "Deblurring of Breathing Motion Artifacts in Thoracic PET Images by Deconvolution Methods" Medical Physics, vol. 33, Issue 10, Oct. 2006, pp. 3587-3600 (Abstract).

Wiemker et al, "Combined Motion Blur and Partial Volume Correction for Computer Aided Diagnosis of Pulmonary Nodules in PET/CT", International Journal of Computer Assisted Radiology and Surgery, vol. 3, No. 1-2, Jan. 1, 2008, pp. 105-113.

Okumura et al, "Augmented Reality Based on Estimation of Defocusing and Motion Blurring From Captured Images", Mixed and Augmented Reality, IEEE/ACM International Symposium, Oct. 1, 2006, pp. 219-225.

Rahmim et al, "Strategies for Motion Tracking and Correction in PET", PET Clin 2, 2007 pp. 251-266.

\* cited by examiner

SYSTEM AND METHOD FOR DETERMINING A PROPERTY OF BLUR IN A BLURRED IMAGE

FIELD OF THE INVENTION

The invention relates to the field of determining a property of blur in a blurred image wherein an object-of-interest of a body is imaged.

BACKGROUND OF THE INVENTION

In medical imaging, movements of the body result in blurred images. Especially when long image recording times are required the movements cause significant deterioration of the quality of the images and the images may contain blurred edges. The intensity at the location of objects, whose size is smaller than or about equal to the distance over which the objects move during the recording, is lower than expected. Very small objects may completely disappear in the noise as the result of blur.

A combination of Positron Emission Tomography (PET) scanning with Computer Tomography (CT) scanning, or a combination of PET scanning with Magnetic Resonance Imaging (MRI) scanning, is often used to investigate whether a tumor is malignant or benign. CT scanning and MRI scanning enable a sharp, and often detailed, image of tissues in the investigated area of a body to be obtained in which tumors may be localized. With PET scanning an image is created in which the intensity of the pixels or voxels relate to the concentration of a specific active molecule. A tracer is bound to the active molecule, which makes the active molecule visible in a PET scanner. For example, when glucose with the tracer is applied to a body, after some time the concentration of glucose will be higher in malignant tumors than in benign tumors. Thus, the intensity shown in PET scanning images may relate to the amount of glucose absorbed by a tumor and as such it may relate to the malignancy of the tumor.

Especially PET scanning requires long image recording times. When the lung of a person or animal is investigated, the PET images of the lung area will be subject to a lot of blur, because of the pulmonary movement. The CT scan records the image by obtaining images of slices of the body. Each of the recordings of a slice is relatively short such that each slice may be recorded during a single breath-hold. The absence of the pulmonary movement during CT scanning results in relatively sharp images.

Thus, when pulmonary tumors are investigated with a combined PET-CT/MRI scanner, the size of the tumor may be obtained from CT/MRI images and the malignancy of the tumor may be assessed by inspecting the PET image. However, due to the large amount of blur, the malignancy of small tumors is underestimated.

Today, the nuclear physician may estimate the blur and correct the PET intensity profile of the tumor by hand. Alternatively, the estimation and correction are performed automatically. If the nuclear physician estimates the blur, his estimation is based on experience and in general on images shown along the central axes of the investigated body, or along the image axes of the scanner.

Wiemker R., et al., describe in "Combined motion blur and partial volume correction for computer aided diagnosis of pulmonary nodules in PET/CT" (International Journal of Computer Assisted Radiology and Surgery, volume 3, numbers 1-2, published 27 May 2008) a technique to automatically determine the Point Spread Function (PSF) of the blur. A CT volume image is segmented in order to obtain a shape model of a tumor. The method, disclosed in the cited article, determines the Full Width at Half Maximum (FWHM) value of a Gaussian PSF representing the effect of blur. An isotropic PSF is assumed for the blur. Iteratively different Gaussian PSFs, with varying FWHM values, are convoluted with the shape model of the tumor in order to determine how much the convolution result fits the volume image obtained by a PET scan. The FWHM of the Gaussian PSF which results in most cross-correlation between the convolution result and the volume image of the PET scan, is the width of the Gaussian PSF representing the blur in the PET image. Knowing the width of the Gaussian PSF of the blur allows the correction of the maximum PET intensity value or the correction of the volume image of the PET scan.

The authors of the cited article realized that modeling the effect of blur as an isotropic Gaussian PSF is an oversimplification. The authors propose to model blur as an anisotropic PSF by a 3×3 covariance matrix. Such a 3×3 covariance matrix is symmetrical and contains 6 free parameters which must be determined. However, calculating values for the 6 free parameters results in an algorithm that requires a lot of computation power and the algorithm has problems with respect to robustness and numerical stability.

SUMMARY OF THE INVENTION

It is an object of the invention to provide an improved system for obtaining a property of anisotropic blur that is more robust or more efficient.

In accordance with the first aspect of the invention, the system comprises a receiver for receiving the image of an object-of-interest of a body, the image comprising blur. The system further comprises a determining subsystem for determining a value of a characteristic of the blur in the image on individual lines of a plurality of lines intersecting with the object-of-interest at different angles. Thus, the lines extend in different directions. The determination of the value comprises analyzing the first image along the respective lines. Further, the system comprises an obtaining subsystem for obtaining a first direction in which the value of the characteristic of the blur is maximal, based on the determined values on the individual lines of the plurality of lines that extend in different directions.

The system obtains the direction in which the characteristic of the blur is maximal. It is useful for medical experts, or the nuclear physician, to know in which direction the blur is maximal, as this enables them to interpret the image more accurately. It is important to know the direction in which the blur is maximal, because the blur in this direction may be the basis for a correction of the values obtained from the image.

The determining subsystem classifies the characteristic of the blur along the respective lines by means of a value. The determined values may be continuous values or discrete values. What matters with regard to the values is that the values have to be used to rank the lines with regard to the characteristic of the blur, for example, from low to high or from less to more. In an embodiment the determining subsystem may determine, for example, the contrast differences along the respective lines. If more contrast is available along one of the respective lines, the image is probably less affected by blur along this one of the respective lines. The determining subsystem may also calculate the first derivatives of functions representing the intensities of the pixels or voxels along the respective lines. The maximum value of the first derivative is inversely proportional to the amount of blur by which the image is affected along the respective line.

The determination of the value of the blur characteristic is performed on a set of lines that intersect with the object-of-interest at different angles. Consequently, the lines represent a plurality of different directions through the object-of-interest. By determining the values of the characteristic of the blur in different directions, information is obtained about the distribution of the characteristic of the blur in different directions. The knowledge about the distribution of the characteristic in different directions is the basis for determining the first direction in which the value of the characteristic of the blur is maximal.

The system according to the first aspect of the invention is a robust and reliable system to determine a property of the anisotropic blur in the image. The image may be two-dimensional or three-dimensional. Each one of the plurality of lines locally reduces the number of dimensions to one dimension, which is the position on the line. Thus, the determination of the value of the characteristic of the blur is reduced to a simpler determination problem which requires a small amount of free parameters to be determined.

Compared to the known systems or methods which try to find the characteristics of the anisotropic blur by determining the characteristics of the blur in three dimensions, the system of the invention splits the determination problem into a plurality of much smaller determination problems which may be solved efficiently and with robust known methods. As a result, the method efficiently obtains reliable information about the blur in the image by means of a robust method.

In an embodiment, the system further comprises a further receiver for receiving a further image of the object-of-interest that is a sharper image than the image. The determining subsystem analyses the image and the further image along the respective lines for determining the value of the characteristic of the blur in the image.

The image comprises blur and is less sharp than the further image. The further image has, for example, less blur than the image, or has no blur at all. Both images are of an area around the object-of-interest of the body. Both images do not necessarily represent exactly the same area, but what counts is that both images show the object-of-interest. The object-of-interest is a part of the body that is being investigated and the image of which is recorded in order to determine specific properties of the object-of-interest.

By comparing both images along the respective lines, the determination subsystem is much better able to determine accurately the value of the characteristic of the blur along the respective lines, because the further image more accurately shows the real shape of the object-of-interest than the image does. Without the knowledge of the real shape of the object-of-interest, the value of the blur may only be used to rank the characteristic of the blur of the respective lines. By analyzing the further image and the image along the respective lines, the value is more related to the real value of the characteristic of the blur. The value of the characteristic mainly relates to the difference between the blur in the image and the further image. Especially, if the further image is substantially free of blur, the characteristic of the blur represents the total amount of blur of the image compared to an ideal image without blur.

In an embodiment of the system according to the first aspect of the invention, the value of the characteristic of the blur in the first direction is obtained. Knowing the value may be important to interpret the image better.

In an embodiment, the plurality of lines, which lines intersect with the object-of-interest, intersect each other in a common point within the object-of-interest. It is advantageous to have a common point because it results in a better distribution of the lines through the different parts of the object-of-interest. In another embodiment, the common point within the object-of-interest is the centre-of-mass of the object-of-interest. If the common point is the centre-of-mass, the points where the lines cross the border of the object-of-interest will be distributed more evenly over the outer surface of the object-of-interest. In another embodiment the different angles at which the lines intersect with the object of interest are uniformly distributed. Thus, the directions of the lines are uniformly distributed through the space of the object-of-interest. A good overview of the value of the characteristic of the blur may be obtained by uniformly distributing the directions of the lines. The more lines are used the more accurate the overview of the value of the characteristic of the blur becomes.

In an embodiment, the obtaining subsystem for obtaining a first direction comprises a principal blur-direction-determining subsystem and a principal blur value-determining subsystem. The principal blur-direction-determining subsystem serves for determining the principal blur-directions of the characteristic of the blur, which are called the principal blur-directions. The principal blur value-determining subsystem serves for determining, in at least one of the principal blur-directions, the value of the characteristic of the blur.

By definition, one of the principal directions, which is referred to as the first principal blur-direction, is the direction in which the characteristic of the blur is maximal. If the method is used in a two-dimensional image, the second principal blur-direction is perpendicular to the first direction and is often the direction in which the characteristic of the blur is minimal. In a three-dimensional image the first principal blur-direction is the direction in which the characteristic of the blur is maximal. The second principal blur-direction is one of the directions perpendicular to the first principal blur-direction where the characteristic of the blur is maximal. The third principal blur-direction is perpendicular to the first principal blur-direction and perpendicular to the second principal blur-direction. The third principal blur-direction is often the direction where the characteristic of the blur is minimal.

It is important to know the principal directions of the characteristic of the blur, because they provide more detailed information about the blur. More detailed information allows the correction of the properties obtained from the image for the maximum value in the first principal blur-direction of the characteristic of the blur as well as for the minimum value in the second or third principal blur-direction of the characteristic of the blur. More detailed information about the blur may enhance the interpretation of the medical image, such that the values which are taken from the image, or which are measured within the image, correspond more to the real condition of the object-of-interest in the body. More detailed information may be used by a user of the system performing the image processing, for example a nuclear physician, or a medical expert, or more detailed information may be used by another method of processing medical images or by a system for processing medical images.

In a further embodiment, the principal blur-direction-determining system is arranged for calculating a tensor $$T = \sum_{i=1\ldots n} (f_i \vec{r}_i)(f_i \vec{r}_i)^T,$$

wherein i is the index of one of the plurality of lines intersecting with the object-of-interest, n is the number of lines, $\vec{r}_i$ is the vector representing the direction of the i-th line, $f_i$ is the value of the characteristic of the blur on the i-th line, and $(f_i \vec{r}_i)^T$ is the transpose operation on the product of $f_i$ and $\vec{r}_i$.

Calculating the tensor T using the given formula requires only relatively simple vector and matrix operations. A plurality of very efficient implementations of these operations exists in software and hardware. For obtaining the eigenvectors of the tensor T a lot of efficient implementations are available as well. Thus, the principal blur-directions may be calculated efficiently and may be efficiently implemented in software or hardware.

In another embodiment the principal blur value-determining system is arranged for calculating the eigenvalues of tensor T. The eigenvalues are the values for the characteristic of the blur. In a specific embodiment the square root of respective eigenvalues are the blur widths of the blur in the respective principal blur-directions. Obtaining eigenvalues may also be done by known efficient implementations.

In an embodiment, the characteristic of the blur is a blur width. Blur width is a widely accepted characteristic for characterizing blur. Scientists, nuclear physicians and for example medical experts understand the characteristic and are able to use such values for better interpreting images that are affected by blur.

In another embodiment the blur width is defined by Full Width at Half Maximum of a blur function being a Gaussian distribution. Blur may best be characterized by a blur function that is a Gaussian distribution. The Gaussian distribution is a good statistical description of blur. Full Width at Half Max (FWHM) is a well-known parameter for characterizing a specific Gaussian distribution, and thus to characterize the blur width. The FWHM is the width of the distribution at a value that is half the maximum value. In another embodiment the sigma ($\sigma$) of the Gaussian distribution is used as the parameter to describe the blur.

In an embodiment, the determining subsystem comprises an intensity profile-determining subsystem and a value determining subsystem. The intensity profile-determining subsystem serves for determining the value of the characteristic of the blur on individual lines of the plurality of lines and comprises the step of determining along each one of the plurality of lines a first intensity profile in the image and a second intensity profile in the further image. The intensity profile-determining subsystem is suitable for determining the value of the characteristic of the blur on individual lines of the plurality of lines. The value of the characteristic of the blur on a specific line is the specific value of the characteristic of the blur that results in a substantially good match between the first intensity profile along the specific line and an application of a blur distribution having the respective value of the characteristic of the blur to the second intensity profile.

The intensity profile-determining subsystem obtains information that reduces the number of dimensions available in the image and further image. An intensity profile may be seen as a function with one variable, which is the position on the line. It is advantageous to reduce the number of dimensions, because it results in a simpler problem to be solved. The low number of dimensions in the intensity profiles allows the use of blur distributions which are also a function with only one free variable, which is less than the number of free variables in the anisotropic blur distribution of the state of the art. Consequently, efficient algorithms may be used to apply the blur distribution to the second intensity profile and to find a well-matching blur distribution.

In a further embodiment, the value determining subsystem is arranged to perform a series of actions for each individual line of the plurality of lines. The series of actions start with selecting a plurality of blur distributions wherein the value of the characteristic of the blur differs in each one of the plurality of blur distributions. Subsequently, the actions continue with convolving individual blur distributions of the plurality of blur distributions with the second intensity profile of the respective line and determining for individual convolution results how much the convolution result matches with the first intensity profile on the respective line. Finally, the value determining subsystem selects, for each individual line of the plurality of lines, the value of the characteristic of the blur for which the convolution result best matches the first intensity profile on the respective line.

The value determining subsystem is arranged to perform an effective search algorithm in which for each one of the individual lines different blur distributions are tried and the one with the best match is selected. The best match delivers the value for the characteristic of the blur that, within an error margin, is the value of the characteristic of the blur on the respective line. The error margin may be reduced by convolving more blur distributions. However, by convolving more blur distributions more calculation time is used. Thus, the system may flexibly choose between more accuracy and shorter runtimes.

In an embodiment the image is an image of the object-of-interest obtained by a Positron Emission Tomography (PET) scanner. In a further embodiment the further image is an image of the object-of-interest obtained by a Computer Tomography (CT) scanner. It is to be noted that other image scanning techniques may be used as well. The invention is based on the fact that the image is subject to blur and the further image is a sharper image than the image. Every pair of image acquisition techniques that result in an image affected by blur and a further image that is sharper than the image, may be used to obtain the image and the further image.

In another embodiment the further receiver is arranged for obtaining a sharper image of the object-of-interest than the image obtained by an image obtaining system, segmenting the sharper image to obtain a shape model of the object-of-interest, and creating the further image based on the shape model of the object-of-interest such that the object-of-interest is sharply imaged in the further image. The sharper image may be received from a CT scanner. Segmenting the sharper image or a CT image is a well-known technique which may be used to obtain two or three-dimensional shape models of objects in the CT image or in the sharper image. It is advantageous to have the shape model of the object-of-interest, because the shape model accurately shows the shape and size of the object-of-interest. In order to determine the amount of blur in different directions in the image, some knowledge about the exact shape of the object-of-interest is required, as it enables a person skilled in the art to know how the object would have been imaged in the absence of blur, and thus the amount of blur by which the image is affected may be determined. The creation of the further image based on the shape model of the object-of-interest is the creation of an image which shows how the object-of-interest would have been imaged if the imaging was ideal, i.e. in the absence of blur. Thus, the further image is a good basis for determining the total amount of blur affecting the image.

In another embodiment the further receiver is arranged for matching a mathematical shape model with the object-of-interest as imaged in the image and creating the further image based on the matched mathematical shape model of the object of interest, wherein the matched mathematical shape model is sharply imaged in the further image. It is not always possible to obtain an additional image of the object-of-interest that is relatively sharp by means of, for example, a Computer Tomography scanner. Especially when the image was received from a data storage system, the person who was scanned is not available anymore to obtain another image by a scanning technique. If the person is still available and the image was obtained in the past, the object-of-interest is most probably in another condition than the object-of-interest was at the time the image was obtained. An estimation of the shape and size of the object-of-interest may be helpful in such situations. Although the image is blurred, the image still contains information about the object-of-interest. For certain types of objects-of-interest it is accurately known how a certain shape appears blurred in the image. For example, mathematical models of tumors are available, and based on research it is quite well known how a tumor of a certain type is imaged in the image under the influence of blur. Matching the mathematical models with the information on the object-of-interest in the image, results, within certain accuracy margins, in a reasonably good estimation of the shape of the object-of-interest. As discussed before, knowing the shape and size of the object-of-interest results in an accurate determination of the values of the characteristic of the blur for the lines intersecting with the object-of-interest. As a result of more accurate values for the characteristic of the blur, the end result of the method of the invention is more accurate.

In an embodiment, the system further comprises a measurement subsystem for measuring a value related to the object-of-interest in the image, and comprises a correction subsystem for correcting the measured value based on at least one of the principal blur-directions and the respective value of the characteristic of the blur in at least one of the principal blur-directions. Knowledge of the principal directions of the characteristic of the blur, including the respective values for the characteristic, provides information by means of which it may be estimated how much the effect of the blur is in the image. For example, if the intensity of a pixel or voxel in or close to the centre-of-mass of the object-of-interest is measured and if the value of the maximum blur width in a specific direction is known, one may obtain, for example, from a pre-defined table a correction factor by which the measured intensity has to be corrected. Thus, the nuclear physician or medial expert may obtain more reliable information from the image.

In a further embodiment, the system may comprise a sharpening subsystem for sharpening at least a part of the image by use of a blur distribution having in at least one of the principal blur-directions the characteristic of the blur with the respective values. The system may further comprise a principal intensity profile subsystem for obtaining from the image a principal intensity profile along at least one of the principal blur-directions. The system may further comprise a transforming subsystem for transforming the image and/or the further image such that the principal blur-directions form the axes of a coordinate system in the transformed image or transformed images. Further, the system may comprise data storage for storing the sharpened part of the image, and/or for storing the principal intensity profile, and/or for storing the transformed image and/or the transformed further image. In a further embodiment the system may comprise a presentation subsystem for presenting the sharpened part of the image, and/or for presenting the principal intensity profile, and/or for presenting the transformed image and/or the transformed further image.

Nuclear physicians and medical experts are used to investigating objects-of-interest on the basis of reviewing intensity profiles in which the intensity curve along a line through the object-of-interest is shown. These profiles are, in general, generated for directions parallel to the axes of the image, or parallel to the axes of the body comprising the object-of-interest. However, it is much more important for the users to review an intensity profile in a direction in which the characteristic of the blur is maximal and in a direction in which the characteristic of the blur is minimal. The nuclear physician and/or the medical expert have to know the worst-case intensity profile in order to be able to interpret the set of intensity profiles more accurately.

Making part of the image sharper is called de-blurring. During image recording, blur was introduced and de-blurring is the inverse. The result is an image in which part of the image shows what the image would have looked like if no blur was introduced during the image recording step. The sharpened part better shows the part of the body in conformity with the real condition of the part of the body. Further, the intensity values of the pixels or voxels in the sharpened part of the image are closer to or equal to the intensity values that the pixels or voxels would have in the ideal case. Therefore, information obtained from the sharpened image is more reliable than information obtained from the image.

Users of medical images, like nuclear physicians and medical experts, often view images in a specific coordinate system, for example, the coordinate system of the image, or in a virtual coordinate system formed by the axes of the body. The nuclear physician or the medical expert often view slices of, for example, the volume image and the slices are in general parallel to the axes of the coordinate system. Thus, if the image and/or the further image are transformed such that the principal blur-directions form the coordinate system, the transformed image and/or the second transformed image are prepared for use by nuclear physicians or medical experts.

According to a second and third aspect of the invention, a medical image acquisition apparatus and a medical workstation, both comprising the system, are provided. The medical image acquisition apparatus and the medical workstation provide the same benefits as the system according to the first aspect of the invention.

According to a fourth aspect of the invention, a method of determining a property of blur in an image is provided. The method comprises the step of receiving the image of an object-of-interest of a body, the image comprising blur. A further step comprised in the method is the step of determining a value of a characteristic of the blur in the image on individual lines of a plurality of lines intersecting with the object-of-interest at different angles and thus extending in different directions, wherein the determination comprises analyzing the image along the respective line. The method further comprises the step of obtaining a first direction in which the value of the characteristic of the blur is maximal, based on the determined plurality of values on the respective plurality of lines that extend in different directions. The method in accordance with the second aspect of the invention provides the same benefits as the system in accordance with the first aspect of the invention.

According to a fifth aspect of the invention, a computer program product comprising instructions for causing the processor system to perform the method is provided. The computer program product provides the same benefits as the system in accordance with the first aspect of the invention.

These and other aspects of the invention are apparent from and will be elucidated with reference to the embodiments described hereinafter.

It will be appreciated by those skilled in the art that two or more of the above-mentioned embodiments, implementations, and/or aspects of the invention may be combined in any way deemed useful.

Modifications and variations of the system, and hence of the method, which correspond to the described modifications and variations of the system, can be carried out by a person skilled in the art on the basis of the present description.

A person skilled in the art will appreciate that the method may be applied to multidimensional image data, for example, to 2-dimensional (2-D), 3-dimensional (3-D) or 4-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

Figure 1:
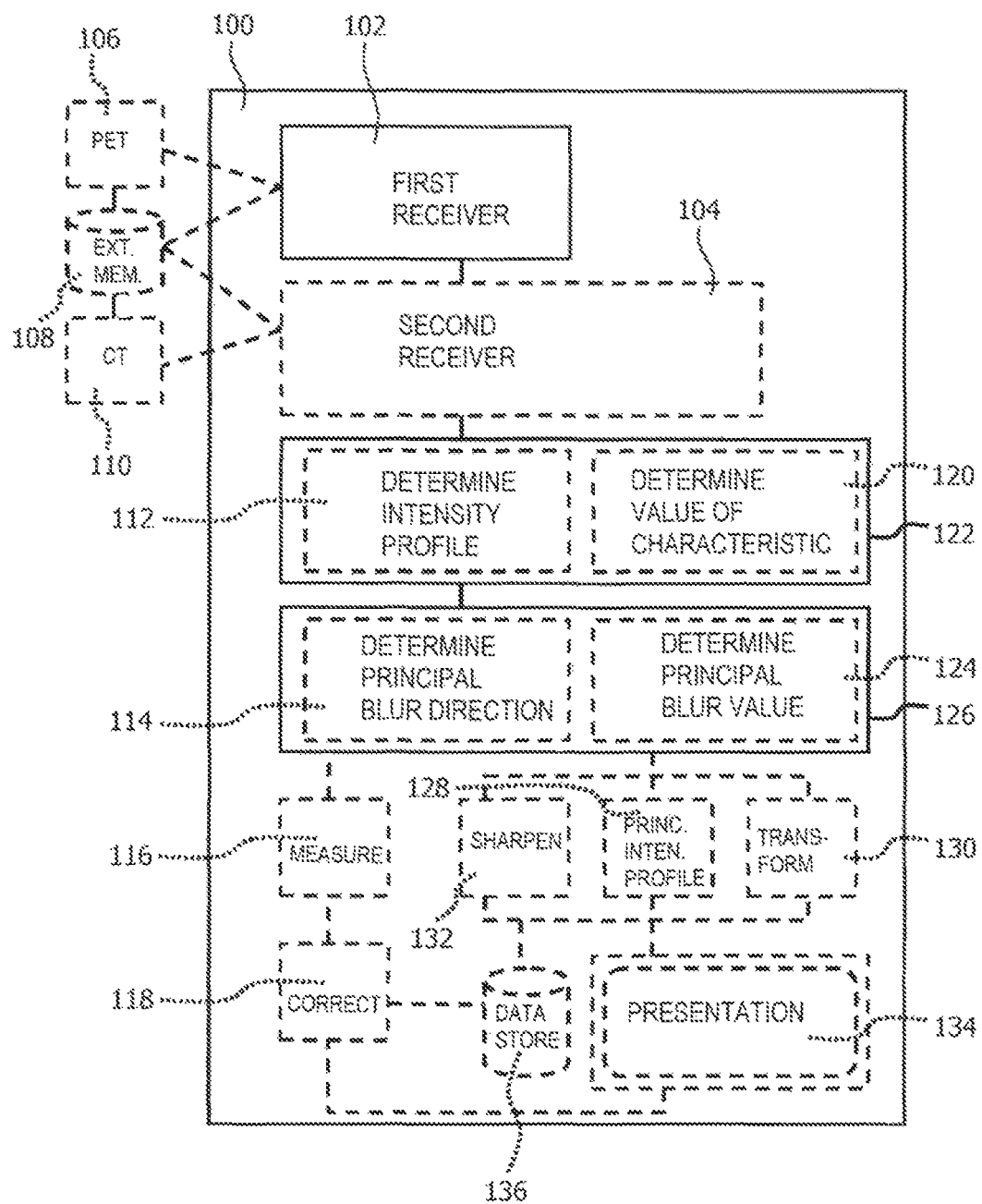
FIG. 1 schematically shows the system for determining the principal blur-directions of a characteristic of the blur, FIG. 2a schematically shows a first image and a second image, FIG. 2b schematically shows two intensity profiles on a first line intersecting the object-of-interest, and two intensity profiles on a second line intersecting the object-of-interest, FIG. 3a schematically shows the segmentation of an image obtained by a Computer Tomography scanner and the creation of a sharp image, FIG. 3b schematically shows two intensity profiles on a first line intersecting the object-of-interest, FIG. 4a schematically shows an image of a tumor obtained by a Positron Emission Tomography scanner, FIG. 4b schematically shows three intensity profiles of the image along the principal blur-directions, and FIG. 5 schematically shows in a flow chart the method according to the second aspect of the invention.

It should be noted that items denoted by the same reference numerals in different Figures have the same structural features and the same functions, or are the same signals. If the function and/or structure of such an item have been explained, there is no necessity for repeated explanation thereof in the detailed description.

DETAILED DESCRIPTION

A first embodiment is shown in FIG. 1.

FIG. 1 schematically shows the system 100 of the invention. The system 100 is capable of investigating a property of the blur in a PET image. System 100 comprises a first receiver 102, an optional second receiver 104, a determining subsystem 122 and an obtaining subsystem 126. In an embodiment, the determining subsystem 122 may comprise an intensity profile-determining subsystem 112 and a value determining subsystem 120. In an embodiment, the obtaining subsystem 126 may comprise a principal blur-direction-determining subsystem 114 and a principal blur value-determining subsystem 124. In another embodiment of the system 100, the system 100 further comprises a measurement subsystem 116 and a correction subsystem 118. In another embodiment of the system 100, the system further comprises a sharpening subsystem 132, and/or a principal intensity profile subsystem 128, and/or a transforming subsystem 130, and/or a data storage 136, and/or a presentation subsystem 134. FIG. 1 further shows a Positron Emission Tomography (PET) scanner 106, an external data storage 108 and a Computer Tomography (CT) scanner 110. The PET scanner 106, the external data storage 108 and the CT scanner 110 are not part of the system 100.

The first receiver 102 receives a PET image. The PET image is a two-dimensional image or a three-dimensional image of an area of a body and is obtained by a Positron Emission Tomography (PET) scanner 106. The PET image is affected by blur because of long PET image recording times. The first receiver 102 may receive the PET image immediately after the construction of the PET image by the PET scanner 106. In another embodiment, the PET image is received from an external data storage system 108 in which the PET image was stored after the construction of the PET image by the PET scanner 106. The PET image shows at least one object in which the user of the system 100 is interested. The object-of-interested is, for example, a tumor in the lung of a person and the user of the system 100 uses the system 100 to classify the tumor as malignant or benign.

The second receiver 104 receives a CT image. The CT image is obtained by a Computer Tomography (CT) scanner 110 and is an image of the same area of the same body as the area of the body that is imaged in the PET image. However, the areas need not be identical; what counts is that the part of interest of the body is present in both images. The CT scanner 110 may be integrated with the PET scanner 106, so that CT image recording takes place during the same scanning session as that used for obtaining the PET scan. In another embodiment a separate CT scanning session and a separate PET scanning session are used to generate the CT image and the PET image, respectively, and the results of the scanning sessions are scaled, rotated and/or translated such that the same area of interest is imaged in the PET image and the CT image.

The CT image may be received immediately after recording the CT image, or may be received from an external data storage 108. In general the CT image is much sharper than the PET image, because the recording time per slice of the body is relatively short for CT scanning and relatively long for PET scanning Consequently, movements of the body, or of parts of the body, adversely affect the quality of the image obtained by the PET scanner 106. Especially when the PET scanner 106 is used to record an image of one of the lungs of a person, the respiratory movement will introduce a lot of blur. Other organs which are located close to the lungs, for example the liver, move accordingly.

It is to be noted that the received image by the first receiver 102 is an image that is affected by blur. Not only PET images are subject to blur. Other scanning or imaging techniques may also produce blurred images of the object-of-interest. The image received by the CT scanner is a sharper image than the PET image. Not only CT images are sharper than PET images. Other scanning or image acquisition techniques may create sharper images of the object-of-interest as well.

In an optional embodiment, the second receiver 104 is arranged to segment the CT image to obtain a shape model of the object-of-interest and to create a third image on the basis of the shape model. Segmentation of the CT image means that for one or more objects in the CT image a two or three-dimensional shape model is created. Segmentation of a CT image is a known technology and is often based on edge detection. CT images are in general relatively sharp images and borders of objects may be detected from a transition of one intensity value to another intensity value. The shape model of the object-of-interest represents accurately the real object-of-interest and clearly shows the size of the object-of-interest, the orientation in the body, and the exact shape of the object-of-interest.

The second receiver 104 may, in this optional embodiment, further be arranged to create a third image of the area of the body that was imaged by the CT image and the PET image. The third image is a sharper image than the PET image and is created on the basis of the results of the segmentation of the CT image. At least the object-of-interest is sharply imaged in the third image. Very bright pixels or voxels may be created if the pixel or voxel lies completely within the shape model of the object-of-interest. The pixel or voxel may obtain a low intensity if the pixel or the voxel is completely located outside the shape model. Alternatively the pixel or voxel may receive a brightness that is related to the ratio between the parts of the pixel or voxel that are located inside the shape model of the object-of-interest and the parts of the pixel or voxel that are located outside the shape model of the object-of-interest.

The determining subsystem 122 determines intensity profiles along individual lines of a plurality of lines intersecting with the object-of-interest at varying angles. Thus, each one of the lines represents another direction. In an embodiment, the lines which intersect with the object-of-interest pass through the centre-of-mass of the object-of-interest. In an embodiment the angles at which the object-of-interest is intersected are uniformly distributed.

In an optional embodiment, the determining subsystem 122 comprises an intensity profile-determining subsystem 112 that determines for individual lines a first intensity profile and a second intensity profile. The first intensity profiles represent the intensity distribution of the PET image along the individual lines. The second intensity profiles represent the intensity distribution of the CT image along the individual lines if the second receiver 104 did not create the third image, and the second intensity profiles represent the intensity distribution along the individual lines in the third image if the second receiver created the third image. The lines intersect with pixels or voxels in the image. The intensities of these pixels or voxels deliver the intensities for the position of the pixel or voxel on the line which results in the intensity profile.

In an optional embodiment, the determining subsystem 122 comprises a value determining subsystem 120 for determining, on the individual lines of the plurality of lines, a value of the characteristic of the blur that results in a substantially good match between the first intensity profile and a blur distribution applied to the second intensity profile. The blur distribution has the respective value of the characteristic of the blur.

In an optional embodiment, the value determining subsystem 120 is arranged for selecting a plurality of blur distributions wherein the value of the characteristic of the blur differs in each one of the blur distributions. The value determining subsystem 120 is further arranged to perform a series of actions for each one of the individual lines of the plurality of lines. The series of actions select a plurality of blur distributions wherein the value of the characteristic of the blur differs in each one of the plurality of blur distributions. Subsequently, individual blur distributions of the plurality of blur distributions are convolved with the second intensity profile of the respective line. For individual convolution results it is determined how much the convolution result matches with the first intensity profile of the respective line. Finally, for the respective line, there is selected the value of the characteristic of the blur at which the convolution result best matches the first intensity profile of the respective line. Thus, the result is that for each individual line of the plurality of lines it is known to which extent the PET image is affected by blur.

Different types of distributions may be used as well as different characterizing values for defining the blur width of the distribution. A commonly used distribution is a Gaussian blur distribution, of which the blur width may be defined by the Full Width at Half Maximum (FWHM).

The obtaining subsystem 126 obtains a direction in which the blur width is maximal. The direction may be one of the directions of the plurality of lines in which a maximal blur width was found that is larger than all other blur widths found. Other techniques may be used to find the direction, for example by estimating a blur distribution having respective blur widths in the different directions of the plurality of lines. The estimated blur distribution has a maximum blur width in one or more directions, one of said directions being selected as the direction.

In an optional embodiment, the obtaining subsystem 126 may comprise a principal blur-direction-determining subsystem 114 for determining the principal blur-directions on the basis of the determined blur characteristics on the individual lines of the plurality of lines. The obtaining subsystem 126 may further comprise a principal blur value-determining subsystem 124 for determining in at least one of the principal blur-directions the value of the characteristic of the blur.

The principal blur-direction-determining subsystem 114 may be arranged to calculate a tensor based on the subsequent formula:

$$T = \sum_{i=1 \ldots n} (f_i \vec{r}_i)(f_i \vec{r}_i)^T \qquad (1)$$

wherein i is the index of one line of the plurality of lines intersecting with the object-of-interest, n is the number of lines, $\vec{r}_i$ is the vector representing the direction of the i-th line, $f_i$ is the value of the characteristic of the blur on the i-th line, and $(f_i \vec{r}_i)^T$ is the transpose operation on the product of $f_i$ and $\vec{r}_i$.

The principal blur-direction-determining subsystem 114 is further arranged to calculate the eigenvectors of the tensor T. The eigenvectors of the tensor T are the so-termed principal directions of the blur width. If the method is applied to volume images, three eigenvectors are obtained. The first principal blur-direction is the direction of the overall maximum blur width. The second principal blur-direction is a direction perpendicular to the first principal blur-direction and the second principal blur-direction has the maximum blur width of all directions perpendicular to the first principal blur-direction. The third principal blur-direction is perpendicular to the first principal blur-direction and to the second principal blur-direction and is often the direction in which the blur width is minimal.

The principal blur value-determining subsystem 124 may be arranged to calculate the eigenvalues of the tensor T. Each eigenvalue belongs to one eigenvector and thus to one principal blur-direction. The square root of the eigenvalue is the value for the width of the blur.

The information obtained by the obtaining subsystem 126 may be used by the nuclear physician or the medical expert to interpret the PET image, for example, to correct values for the maximum amount of blur obtained from the PET image.

In an optional embodiment, the system 100 obtains specific information from the PET image and/or the CT image by the sharpening subsystem 132, the principal intensity profile subsystem 128, or the transforming subsystem 130. The specific information is presented on the presentation subsystem 134 to the user of the system. In another embodiment, the obtained specific information is stored in the data storage 136.

The sharpening subsystem 132 makes at least a part of the PET image sharper by de-convoluting the PET image with a blur distribution. The blur distribution is an anisotropic distribution and has in at least one of the principal blur-directions the characteristic of the blur with the respective value. The sharpened part of the PET image is presented by the presentation subsystem 134 to the user of the system 100. The result of a de-convolution is that the grey levels of the pixels or voxels close to the centre-of-mass of the object-of-interest are compensated for the blur and their intensities become closer to or equal to the intensities that were expected based on the physical conditions of the object-of-interest.

The principal intensity profile subsystem 128 obtains a principal intensity profile along individual directions of the principal blur-directions. A plurality of principal intensity profiles may be obtained from the PET image and/or a plurality of intensity profiles may be obtained from the CT image. The principal intensity profiles are presented by the presentation subsystem 134 such that a user is able to investigate the intensity profiles along the principal blur-directions.

The transforming subsystem 130 transforms the PET image and/or the CT image such that the principal blur-directions become the axes of a coordinate system of the PET image and/or the CT image. The transformed image is, or the transformed images are, presented to the user of the system 100 by the presentation subsystem 134. In another embodiment the transformed images are stored in the data storage 136.

In an optional embodiment, system 100 comprises a measurement subsystem 116 for measuring a value related to the object-of-interest in the PET image, and a correction subsystem 118 for correcting the measured value, based on at least one of the principal blur-directions and respective principal blur values. The measured value may be an intensity value of a pixel or voxel close to the centre-of-mass of the object-of-interest. This intensity value may be corrected for the blur, based on one of the principal blur-directions and the value of the characteristic of the blur in respective principal blur-directions. Standard tables with correction factors can be used to correct the measured intensity, based on the maximum amount of blur in a specific direction and the minimum amount of blur in another direction. The corrected value of the measurement may be presented to the user of the system in a presentation subsystem 134 or stored in the data storage 136.

Figure 2A:
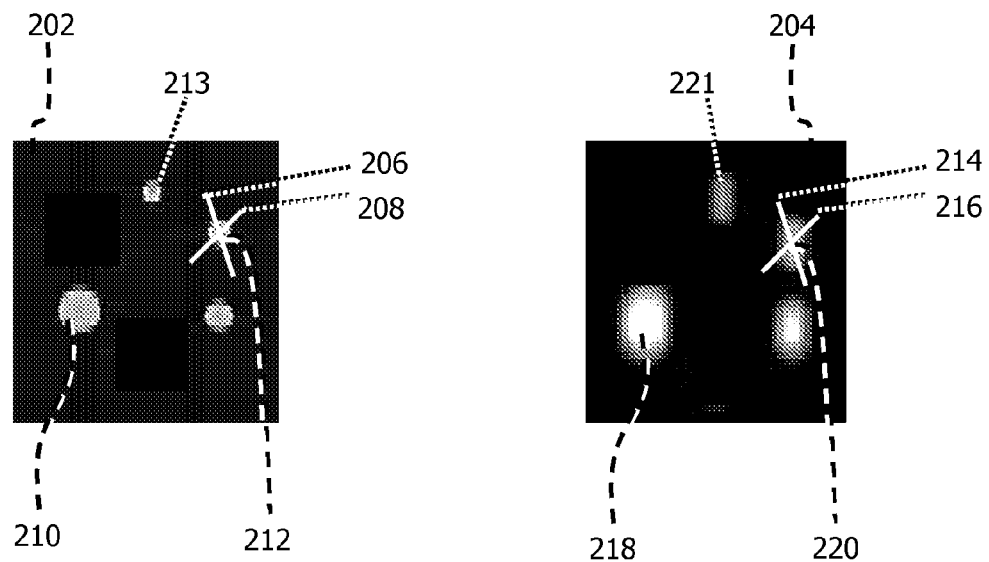

FIG. 2a shows at the left a CT image 202 of an area of a body, for example an area of one of the lungs of a person or of the liver of the person. The CT image is an image that is obtained by a CT scanner of a combined Computer Tomography/Positron Emission Tomography (CT/PET) scanner. The CT/PET scanner images the area of the body by means of a Computer Tomography scanning technique and by means of a Positron Emission Tomography scanning technique. The CT image 202 shown in FIG. 2a is a two-dimensional image. However, the system according to the invention may be used for volume images as well.

The CT image 202 shows four objects, which may be tumors. Two lines 206, 208 intersect with object 212. In the CT image 202 a further object 210 is indicated. FIG. 2a further shows a PET image 204 being a recording of the same area of the body as CT image 202. The PET image is obtained by the Positron Emission Tomography scanner of a combined CT/PET scanner. As a result of blur the PET image 204 is less sharp than CT image 202. The PET image 204 shows the plurality of objects as well. Object 218 corresponds to the object 210 of the CT image 202, and object 220 corresponds to the object 212 of the CT image 202. The direction of line 214 corresponds to the direction of line 206, and the direction of line 216 corresponds to the direction of line 208. In the PET image, the two lines 214, 216, which intersect with object 220, are drawn as well.

Object 210 as shown in the CT image is relatively large. The relatively small object 212 is the investigated object-of-interest 212. If the object-of-interest 212 is a tumor, the object-of-interest is investigated by a nuclear physician or a medical expert to determine whether the tumor is malignant or benign. To determine whether a tumor is malignant or benign, both the size of the tumor and the Standard Uptake Value (SUV) is important. The SUV is a normalized intensity value shown in PET images. The CT image 202 is used to measure the size of the tumor. The SUV value of the tumor may be found in the PET image 204 by measuring the intensity of a pixel in or close to the centre-of-mass of the object 220.

As may be seen in FIG. 2a, the PET image 204 is less sharp than the CT image 202 and has blur in the vertical direction. As a result of the blur, smaller objects have a lower intensity in the PET image 204 than objects which are larger. For example, object 212 has grey pixels in the centre of the object 220, while object 218 has white pixels in the centre. At least the intensity of object 220 in the PET image 204 is reduced as the result of blur; further it may be possible that object 220 is a less malignant tumor than object 218. It has to be noted that object 213 which is clearly visible in CT image 202, is only visible as a plurality of dark grey pixels 221 in the PET image 204. This shows how substantial the effect of blur may be on very small objects. This effect of blurring results in the underestimation of the SUV of the pixels close to the centre of the very small object.

Figure 2B:
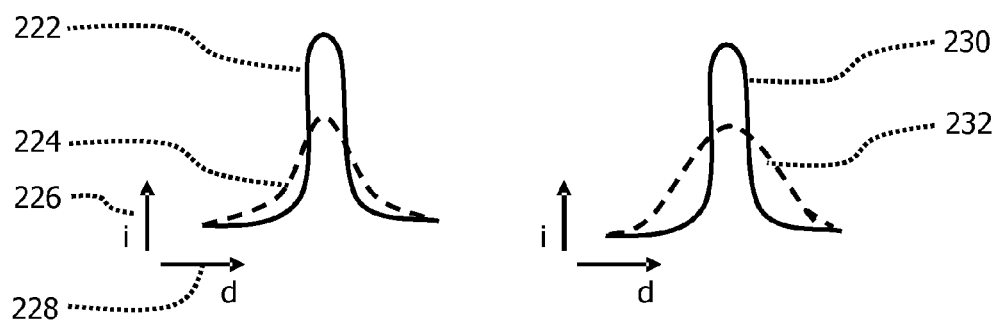

FIG. 2b shows on the left side two intensity curves 222, 224 and on the right side two intensity curves 230, 232. The y-axis 226 represents the value of the intensity i as imaged in the CT image 202 or the PET image 204. The x-axis 228 represents the distance d on lines 208 or 216. Curve 222 is the intensity profile along line 208 in the CT image 202. Curve 224 is the intensity profile along line 216 in the PET image 204. The intensity profiles 222, 224 on the left are generated for lines 208, 216, which are lines intersecting with the object-of-interest and both lines follow the same path through the object.

On the right side of FIG. 2b two other intensity profiles are shown. Curve 230 is the intensity profile along line 206 in the CT image 202. Curve 232 is the intensity profile along line 214 in the PET image 204.

Curves 222 and 230 have similar shapes. This means that the object 212 has a similar shape along the lines 206 and 208. Therefore it may be concluded that the tumor in the body which is recorded as object 212 in the CT image 202 is probably a spherical object. However, as curve 224 and curve 232 shows, the object 220 seems to be wider along line 214 than along line 216. This is the result of blur in one specific direction. Along line 214 the PET image 204 is more affected by blur than along line 216, because curve 232 is much wider than curve 224; at least curve 232 is much wider than curve 224 when the width is compared to the width of curve 230 or curve 222, respectively.

According to the system of the invention, the system has to quantify the amount of blur in the PET image 204 along each one of the lines 214, 216. The quantification along line 216 may be done by convoluting a curve 230, which is the intensity profile along line 208 in the CT image, with a plurality of blur distributions of varying blur widths. At least one of the plurality of convolution results best matches with curve 232. The blur width belonging to the blur distribution that results in the best match between the convolution result and curve 232 is the value for the blur width in the direction of line 214.

The quantification of the blur width along line 216 is done in the same way as discussed above. Curve 222 is convoluted with a plurality of blur distributions having for each convolution a different value for the blur width parameter. At least one of the blur distributions with respective blur width results in a best match with curve 224. This respective blur width is the value for the blur width along line 216.

Subsequently, the system in accordance with the invention determines a direction in which the blur direction is maximal. In the example of FIG. 2, the blur width is determined in two directions only. One of the two directions is the direction in which the blur is maximal. This is the direction of line 214. Although, as seen in the PET image 204, line 214 is not exactly the direction in which the blur is maximal, it is the best estimation for the direction that may be obtained based on the knowledge along two lines. In another embodiment the blur width is determined along more than two lines. With more than two directions, it becomes easier to determine more accurately in which direction the blur width is maximal.

The knowledge about the blur width in the directions of lines 214 and lines 216 in the PET image 204 may be used by the nuclear physician or medical expert to interpret the image more accurately. Although the shown intensity by a pixel close to the centre of object 220 is a grey level, the nuclear physician or medial expert may estimate the amount by which the intensity of the pixel is reduced as a result of blur on the basis of the obtained information. In another embodiment, measurements of Standard Uptake Values of pixels in the PET image 204 are corrected automatically. For example, tables with correction factors which depend on the size of the investigated object and the maximum and minimum blur width are available. It is also possible to create an anisotropic blur distribution with a maximum blur width in a first direction, for example a direction according to line 214, and with a minimum blur width in a second direction, for example a direction according to line 216, and the PET image 204 may be de-blurred by de-convoluting the PET image 204 with the anisotropic blur distribution.

Figure 3A:
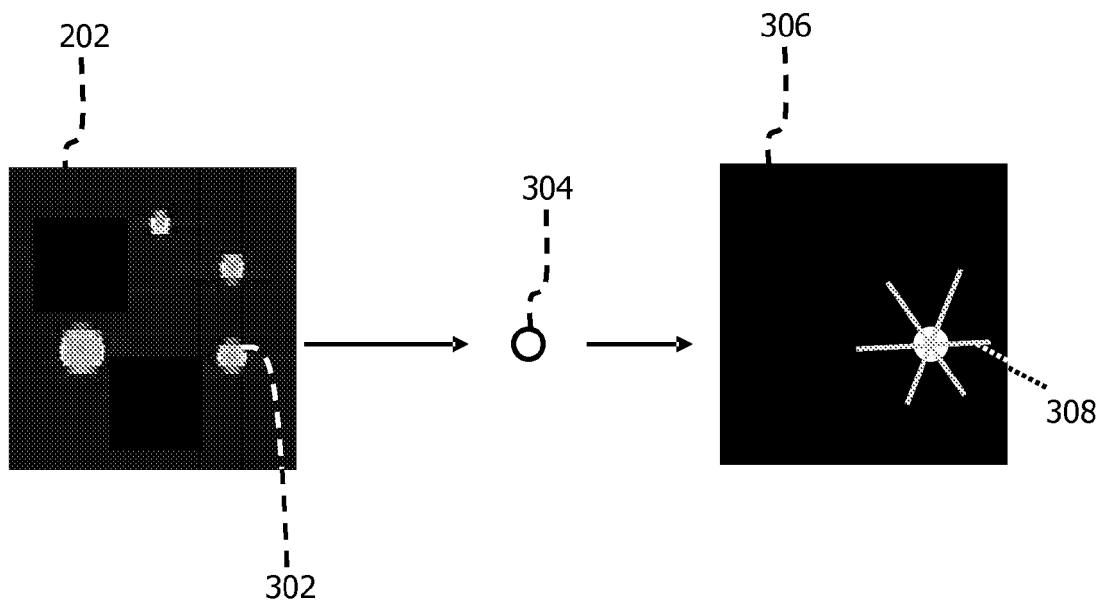
Figure 3B:
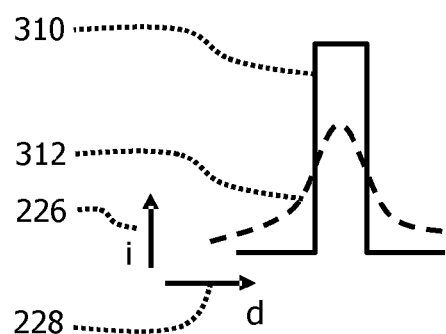

FIGS. 3a and 3b show another embodiment of the invention. FIG. 3a shows on the left side the CT image 202 of FIG. 2a. Object 302 is the object-of-interest. In the embodiment of FIG. 3a, the CT image 202 is segmented. By means of known segmentation techniques, shape model 304 of the object 302 in the CT image 202 is created. In general, segmentation techniques work on the basis of detecting edges in the CT image 202. In general, segmentation of a three-dimensional image results in polygonal, e.g. triangular, mesh surfaces representing the shape and geometry of the objects in the three-dimensional image. Segmentation of a two-dimensional image results in polygons representing the shape and geometry of the objects in the two-dimensional image. In FIG. 3a the shape model of the object-of-interest 302 is schematically shown as a circle 304.

The circular shape model 304 of the object-of-interest 302 is the basis for the creation of a second image 306 that is a sharper image than the first image 204, which is in this embodiment the PET image 204 of FIG. 2b. By knowing the shape of the object-of-interest, a very sharp second image 306 may be created by assigning the highest intensity to pixels in the area within the circle of the shape model of the object-of-interest and assigning the lowest intensity to the pixels in the area outside the circle of the shape model. This results in the second image 306 as shown on the right of FIG. 3a. In another embodiment the transition between pixels with highest and lowest intensity is made smoother.

FIG. 3b shows two intensity curves 310, 312. The y-axis 226 represents the value of the intensity. The x-axis 228 is the position d on the line that intersects with the object-of-interest. Curve 310 is the intensity curve along line 308 in the second image 306. Line 308 goes through the centre-of-mass of the object-of-interest. Since the second image 306 is infinitely sharp, curve 310 is of a rectangular shape with a high intensity within the object-of-interest and a low intensity outside the object-of-interest. Curve 312 is an intensity curve along a line (not shown) in the PET image 204. The line in the PET image 204 goes through the centre-of-mass of the object-of-interest and the direction of the line corresponds to the direction of line 308 in the second image 306.

The blur width along line 308 is determined, as discussed with reference to FIG. 2b, by convoluting curve 310 several times with several blur distributions having different blur widths. The blur width of one of the blur distributions, of which the convolution result matches most with curve 312, is an accurate estimation of the value of the blur width affecting the PET image 204 along line 308.

It is to be noted that the discussion above determines the blur width along line 308. Line 308 is an individual line of the plurality of lines going through the centre-of-mass of the object-of-interest. As can be seen in FIG. 3a, the plurality of lines go through the centre-of-mass of the object-of-interest in the second image 306. The angles intersecting the object-of-interest are uniformly distributed.

Figure 4A:
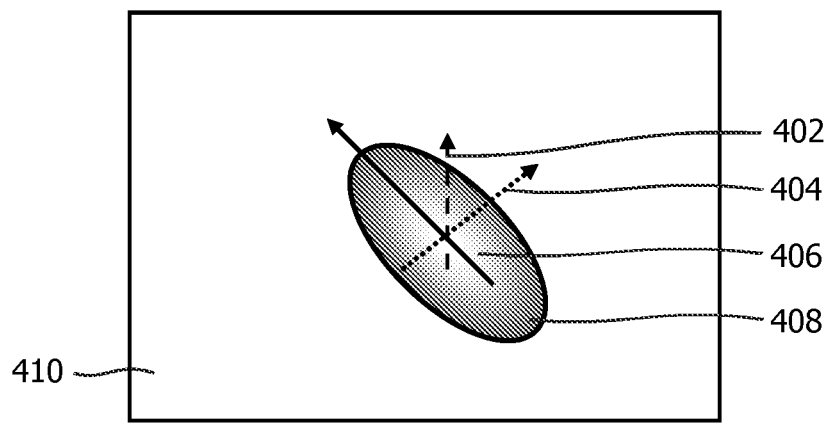
Figure 4B:
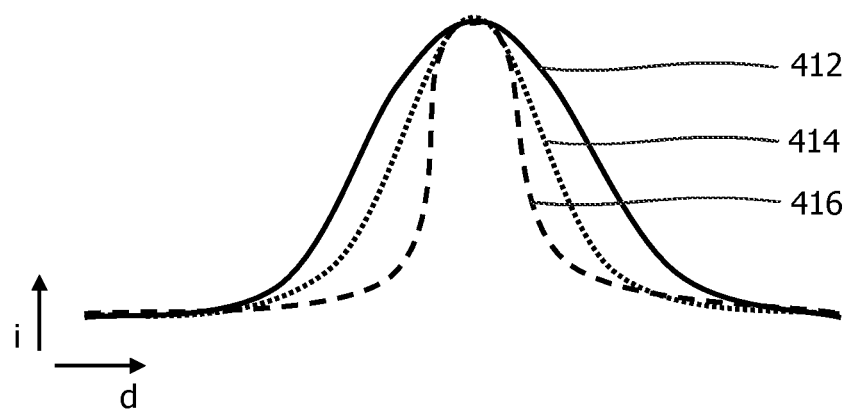

FIG. 4a and FIG. 4b show another embodiment of the invention. An image 410 is presented in FIG. 4a. The imaged object-of-interest 408 is affected by blur. The system of the invention is used to determine the principal blur-directions, which are indicated by the arrows 402, 404, 406. In the principal blur-direction 406 the width of the blur is maximal. In the principal blur-direction 402 the width of the blur is minimal. Along each of the principal blur-directions 402, 404, 406 a principal intensity profile 412, 414, 416 is obtained from the information available in the image 410. The principal intensity profiles 412, 414, 416 are created by recording the intensity of the pixels or voxels along lines formed by the principal blur-directions 402, 404, 406 as a function of the position on the lines. The principal intensity profiles 412, 414, 416 are presented to the user on a presentation subsystem of the system according to the invention. The principal intensity profile 412 belongs to the principal blur-direction 406, principal intensity profile 414 belongs to principal blur-direction 404 and principal intensity profile 416 belongs to principal blur-direction 402. As can be seen in FIG. 4b, the principal intensity profile 416 has a steep profile, which means that the object-of-interest 408 is almost not affected by blur in principal blur-direction 402. Principal intensity profile 412 has a gradually increasing and decreasing profile, which is the result of a maximum blur width in the principal blur-direction 406. Medical experts and nuclear physicians are used to the presentation of intensity profiles 412, 414, 416 of the object-of-interest and they have a lot of experience with correcting measured intensity values for the amount of blur based on the presented intensity profiles 412, 414, 416.

Figure 5:
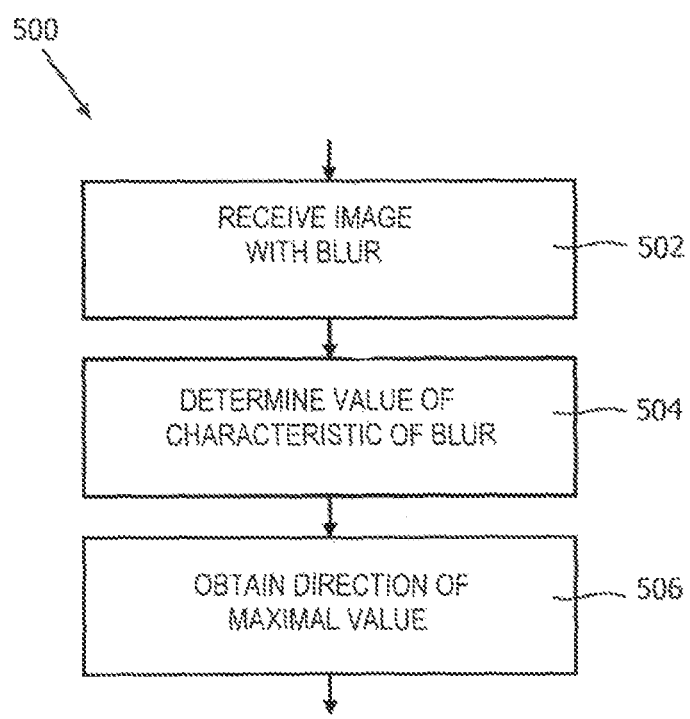

FIG. 5 schematically shows in a flow chart the method 500 of determining a property of blur in an image.

In step 502 an image is received. The image comprises an image of an object-of-interest of a body. The image further comprises blur.

In step 504 a value of a characteristic of the blur in the image on individual lines of a plurality of lines intersecting with the object-of-interest is determined. The lines intersect the object-of-interest at different angles and thus extend in different directions. The determination of the value comprises analyzing the image along the respective lines.

In step 506 a first direction is obtained in which the value of the characteristic of the blur is maximal. Said direction is obtained based on the determined plurality of values on the respective plurality of lines that extend in different directions.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for determining a property of a blur in an image, the system comprising:
   one or more receivers for receiving the image of an object-of-interest of a body, the image comprising the blur, and for receiving a further image of the object-of-interest that is a sharper image than the image with the blur,
   a determining subsystem for determining a value of a characteristic of the blur in the image on individual lines of a plurality of lines intersecting with the object-of-interest at different angles and extending in different directions, wherein the determining subsystem analyzes the image with the blur and the further image along the respective lines for determining the value of the characteristic of the blur in the image; and
   an obtaining subsystem for obtaining a direction in which the value of the characteristic of the blur is maximal, based on the determined values on the individual lines of the plurality of lines, which lines extend in different directions.

2. The system according to claim 1, wherein the plurality of lines intersecting with the object-of-interest at different angles intersect each other in a common point within the object-of-interest.

3. The system according to claim 1, wherein the obtaining subsystem comprises a principal blur-direction-determining subsystem for determining candidate principal blur-directions of the characteristic of the blur, and the system further comprises a principal blur value-determining subsystem for determining in at least one of the candidate principal blur-directions the value of the characteristic of the blur.

4. The system according to claim 1, wherein the determining subsystem comprises:
   an intensity profile determining subsystem for determining for individual lines of the plurality of lines a first intensity profile in the image with the blur and a second intensity profile in the further image, and
   a value determining subsystem for determining on individual lines of the plurality of lines a value of the characteristic of the blur that results in a substantially good match between the first intensity profile and an application of a blur distribution having the respective value of the characteristic to the second intensity profile.

5. The system according to claim 4, wherein the value determining subsystem is arranged for performing the subsequent actions for each one of the individual lines, the actions including:
   selecting a plurality of blur distributions wherein the value of the characteristic of the blur differs in each one of the plurality of blur distributions,
   convolving individual blur distributions of the plurality of blur distributions with the second intensity profile of the respective line,
   determining for individual convolution results how much the convolution result matches with the first intensity profile of the respective line, and
   selecting, for the respective line, the value of the characteristic of the blur for which the convolution result best matches the first intensity profile of the respective line.

6. The system according to claim 1, wherein the further receiver is arranged for obtaining a sharper image of the object-of-interest than the image by means of an image obtaining system,
   segmenting the sharper image to obtain a shape model of the object-of-interest, and
   creating the further image based on the shape model of the object-of-interest.

7. The system according to claim 1, wherein the further receiver is arranged for
   matching a mathematical shape model with the object-of-interest as imaged in the image with the blur, and
   creating the further image based on the matched mathematical shape model of the object-of-interest.

8. The system according to claim 1, wherein the system further comprises
   a measurement subsystem and a correction subsystem for measuring a value related to the object-of-interest in the image and for correcting the measured value, based on at least one principal blur-direction and the respective value of the characteristic of the blur in at least one of the principal blur-directions and/or
   a sharpening subsystem for sharpening at least a part of the image with the blur by use of a blur distribution having in at least one principal blur-directions the characteristic of the blur with respective values, and/or
   a principal intensity profile subsystem for obtaining from the image a principal intensity profile along at least one of the principal blur-directions, and/or
   a transforming subsystem for transforming the image and/or the further image such that the principal blur-directions form the axes of a coordinate system in the transformed image or transformed images, and/or
   a data storage for storing the corrected value, and/or the sharpened part of the image, and/or for storing the principal intensity profile, and/or for storing the transformed image and/or the transformed further image, and/or
   a presentation subsystem for presenting the corrected value, and/or the sharpened part of the image, and/or the principal intensity profile, and/or the transformed image, and/or the transformed further image.

9. A medical workstation comprising:
   the system according to claim 1, and
   a display for presenting the direction.

10. A system for determining a property of a blur in an image, the system comprising:
   a receiver configured to receive the image of an object-of-interest in a subject, the image including the blur;

one or more processor systems configured to:
calculate a tensor $$T = \sum_{i=1\ldots n} (f_i \vec{r}_i)(f_i \vec{r}_i)^T,$$

wherein i is an index of one of a plurality of lines intersecting with the object-of-interest at different angles and extending in different directions, n is the number of lines, $\vec{r}_i$ is a vector representing a direction of the i-th line, $f_i$ is a value of a characteristic of the blur on the i-th line, and $(f_i \vec{r}_i)^T$ is a transpose operation on the product of $f_i$ and $\vec{r}_i$,
  calculate eigenvectors of the tensor T, wherein the eigenvectors extend in blur-directions, to determine a value of the characteristic of the blur in the image on individual lines of the plurality of lines; and
  determine at least one principal blur-direction in which the characteristic of the blur is maximal, and determine in the at least one principal blur-direction the vale of the characteristic of the blur.

11. The system according to claim 10, wherein the characteristic of the blur is a blur width.

12. A method of determining a property of blur in an image with a blur, the method comprising:
  receiving the image with the blur of an object-of-interest of a body,
  receiving a further image of the object of interest which is sharper than the image with the blur,
  determining a value of a characteristic of the blur in the image with the blur on individual lines of a plurality of lines intersecting with the object-of-interest at different angles and extending in different directions, wherein the determining includes analyzing the image with the blur along the plurality of lines, and
  obtaining a direction in which the value of the characteristic of the blur is maximal, based on a determined plurality of values on the plurality of lines that extend in different directions.

13. The method according to claim 12, wherein the image with the blur is received from a nuclear imaging system and the further image is received from one of a computed tomography system and a magnetic resonance imaging system.

14. A non-transitory computer program product comprising instructions for causing a processor system to perform the method according to claim 12.

15. A system for determining a property of blur in an image, the system comprising:
  one or more processors configured to:
    receive a first image with a blur of an object-of-interest of a body and a second image which is sharper than the first image,
    analyze the first image along a plurality of individual lines intersecting with the object-of-interest at different angles and in different directions to determine values of a characteristic of the blur in the first image on the individual lines of the plurality of lines, and
    obtain at least one principal blur-direction in which the value of the characteristic of the blur is maximal, based on the determined values.

16. The system according to claim 15, wherein the one or more processors are further configured to:
  analyze the first image by calculating a tensor from the individual lines intersecting the object-of-interest and calculating eigenvectors of the tensor representing principal blur-directions.

17. The system according to claim 15, wherein the one or more processors are further configured to:
  determine for the individual lines of the plurality of lines a first intensity profile in the first image and a second intensity profile in the second image, and
  for individual lines of the plurality of lines, determine a value of the characteristic of the blur that results in a best match between the first intensity profile and an application of a blur distribution having a respective value of the characteristic to the second intensity profile.

18. The system according to claim 15, wherein the one or more processors are further configured to:
  segment the second image to obtain a shape model of the object-of-interest, and
  match the shape model with the object-of-interest in the first image.

* * * * *